UNITED STATES PATENT OFFICE.

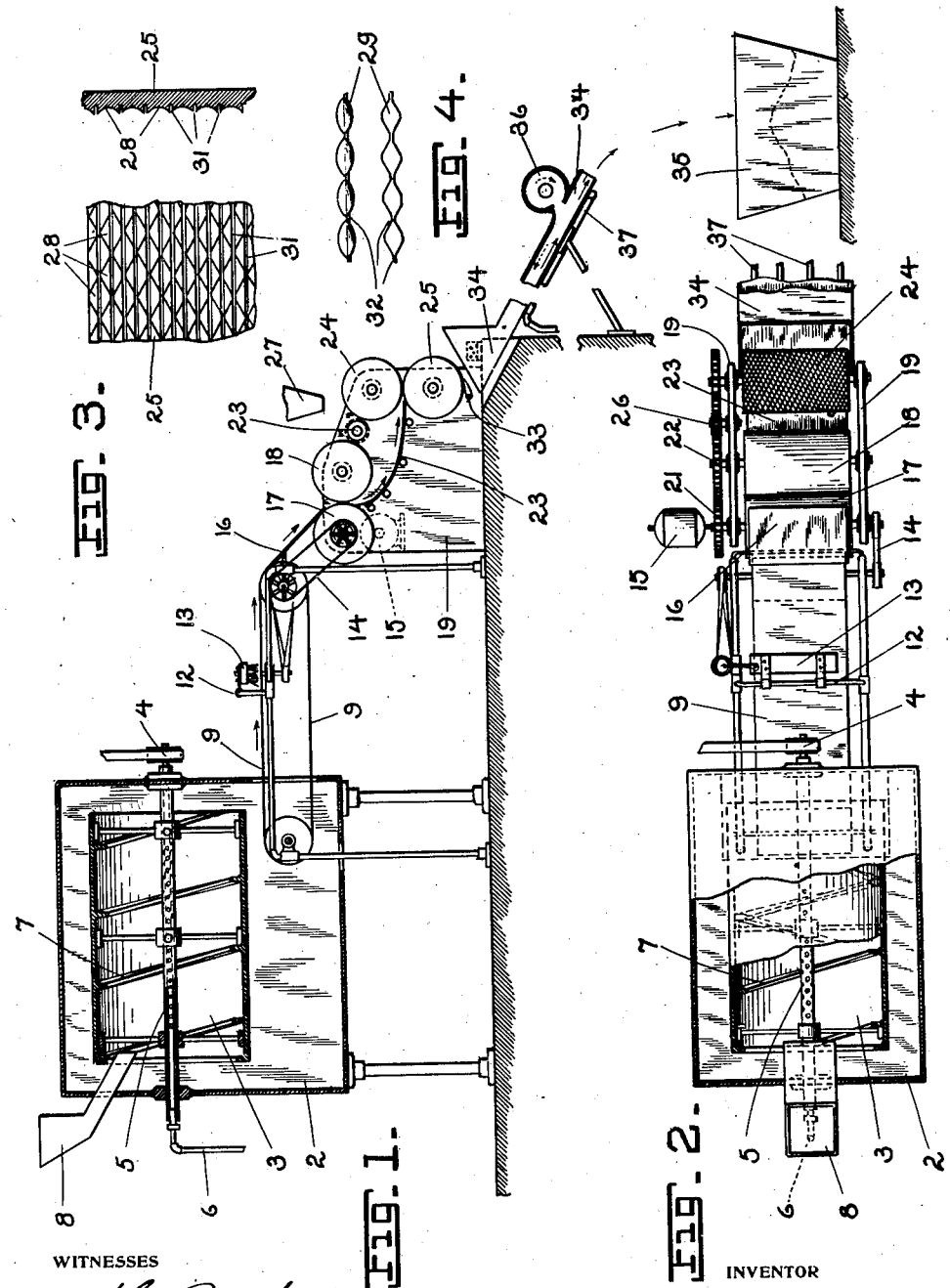

WILLIAM C. BOHRMANN, OF SAN FRANCISCO, CALIFORNIA.

PROCESS OF MAKING POULTRY FEED.

1,057,215.  Specification of Letters Patent.  Patented Mar. 25, 1913.

Application filed January 20, 1912. Serial No. 672,345.

*To all whom it may concern:*

Be it known that I, WILLIAM C. BOHRMANN, a citizen of the United States, and a resident of the city and county of San Francisco, State of California, have invented certain new and useful Improvements in Processes of Making Poultry Feed, of which the following is a specification.

The invention relates to a process of preparing or manufacturing granular poultry feed.

The object of the invention is to provide a process of preparing or manufacturing feed for poultry in a granular form, from the so called "mash feed," or balanced ration.

The invention possesses many other advantageous features, which, with the foregoing will be set forth at length in the following description, where I shall outline in full the characteristics of the feed, the preferred method of making the same and one form of apparatus which may be used in its manufacture.

The novelty of the invention will be included in the claims succeeding and forming part of the present specification. From this it will be apparent that I do not limit myself to the showing made by the drawings and description as I may adopt many variations in the process and in the apparatus within the scope of my invention as expressed in said claims.

In addition to cracked corn, wheat, barley, chop feed and other forms of hard granular foods fed to poultry, poultrymen feed large quantities of so-called "mash feed" which they either mix themselves or purchase in mixed form ready for feeding. These mash feeds consist generally of bran, middlings, shorts, cracked corn, ground bone, oil-cake meal, ground willow charcoal, ground shriveled wheat, dried meat scraps and occasionally some spices or other ingredients of a condimental nature. These materials are mixed dry in various proportions to bring about various nutritive ratios according to the purpose for which the feed is to be used, that is, whether it is to be fed to young growing chicks, to laying hens to stimulate increased egg production or to poultry being fattened for market.

From the nature of the products entering into the composition of mash feeds, it is evident that the finished product or mixture is in a mechanical condition closely resembling what a mixture of wheat flour, bran and cracked corn would be. In this dry powdery or floury form it is universally sold to the poultrymen or when the mixture is made by the poultryman himself, the condition is the same. These mash feeds are fed both wet and dry, some poultrymen placing them before their fowls in the dry condition in which they are bought and others moistening the mash so as to bring about partial cohesion between the dusty particles and render the mass crumbly, this making it easier for the fowls to eat. Both the wet and dry methods of feeding mash feeds are accompanied by their respective advantages and disadvantages and there is consequently a widespread controversy among poultrymen and among scientists as to whether the feeds should be fed wet or dry.

There are certain disadvantages common to feeding by either method and also certain disadvantages peculiar to each method. When fed in either condition large quantities of the feed are scattered and wasted. The feed is placed in a trough so that the fowls are not forced to search and scratch for it, so that they do not get the necessary exercise called for by nature. In fact, some poultrymen also feed wheat grain which they scatter among straw so that the fowls must exercise in order to get it. The feed being fed in a trough it is natural that the weaker fowls are forced away and do not get the required nourishment.

When the mash feed is fed in a wet condition it is evident that considerable time must be employed in preparing it as it is necessary to mix each batch immediately prior to feeding. In warm weather mash will frequently start fermentation within a short time after being mixed and when thus soured it will give the fowls diarrhea and often kills them. There is also very considerable waste in feeding the wet mash due to the fact that some of the mixture adheres to the outside of the fowl's bill which is shaken off and wasted. Further than this, a soft wet food is not a natural food for poultry since nature has constructed their digestive organs to accommodate seeds and other hard granular foods. The feeding of the dry mash feed is also open to many objections. The dry dusty nature of the mixture of the product makes it very difficult for the animals to swallow and consequently they drink much more water than is good for them. This nature of the feed also causes it to scatter and be scattered and on account of the fineness of most of the particles, it cannot be picked up from the ground by the birds. Further than this, unless the mixture is evenly ground, the birds will pick out favorite coarser particles and do not thereby obtain a balanced ration, which is one of the principal reasons for feeding such mash feeds.

In spite of the many disadvantages of mash feeds either wet or dry, there is economy in feeding them as compared to an exclusively grain diet. The ingredients of the mash feed being largely by-products, a certain amount of nutritive elements can be purchased in this form at a lower cost than the same amount of nutritive elements in whole grain or wheat or corn. The mash feed also has the advantage that it produces a balanced ration, that is, a ration in which the various nutritive elements are evenly balanced to be accommodated by the digestive organs of the animal. The two principal nutritive elements in foods are the carbo-hydrates and proteids and these elements should be present in such proportion that they each may be assimilated by the digestive organs. An excess of either element over the proper proportion will cause such excess to pass through the digestive organ unassimilated and the nutritive values thereof are lost.

By the process of my invention, I convert the mash feed into hard small grains approximating in size, dryness and hardness a grain of wheat, thereby obviating all of the disadvantages of mash feed, either in the wet or dry state and at the same time retaining all of its advantages.

The feed of my invention may be fed the same as grain wheat, causing the fowls to exercise to obtain it and presenting a balanced ration in such form and constituency as is called for by the digestive organs.

In carrying out the process the mash feed is moistened, and preferably heated, to such a degree that the particles thereof will partly cohere. The moist feed is then rolled or pressed into granules or similarly shaped bodies of the proper size and then dried to produce the desired condition of dryness and hardness. After being moistened and heated (the two operations being preferably performed simultaneously by the use of steam) I prefer to form the feed into a flat cake of substantially equal thickness and then pressing or rolling the cake to form the granules or particles. The steaming has the effect of simultaneously moistening and heating the starch globules in the feed so that they burst, thereby exposing the starch, which in its moistened condition acts as a binder to assist in holding the various ingredients together after pressure has been applied.

While I have herein referred to the product of my invention as a poultry feed it is evident that the same product, composed of different ingredients, may be used as a feed for cattle and live-stock. The desirability of a balanced ration for live stock is well understood and such rations are fed at the present time in the form of a wet or dry mash feed. When fed in either of these forms it is open to the same disadvantages as when fed to poultry and consequently many objections are made to such feeding.

In the drawings accompanying and forming part of this specification I have shown one form of apparatus for carrying out my process and producing the final product, but it is to be understood that the apparatus may be varied without departing from the spirit of my invention.

Referring to the drawings:—Figure 1 is a side elevation of the apparatus for carrying out the process, parts of the apparatus being shown in section. Fig. 2 is a plan or top view of the apparatus. Fig. 3 is a detail of a fragment of the surface of the lower die roller and a longitudinal section through said fragment. Fig. 4 is a side and top view of the grains or granular product as they are formed in the die rollers.

The apparatus consists of a casing or chamber 2 in which is arranged a drum or cylinder 3 which is revolved by power applied to the pulley 4. The shaft 5 of the drum is hollow and is provided with a plurality of apertures through which steam, which is introduced into the shaft 5 through the pipe 6, may pass. The drum 3 is open at the ends and is provided with an internal spiral rib 7 for causing the movement of the mash feed toward the discharge end as the drum is rotated. A hopper or chute 8, extending from the exterior of the casing 2 into the drum 3 is provided for feeding the feed into the drum.

Before passing into the chute 8, the feed is passed over powerful magnets which extract all iron or steel articles, such as wire and nails, therefrom, so that the pressure, and die rollers will not be injured. The effect of the steam in the drum is to slightly moisten the dry mash feed and heat it, so that the starchy and glutinous substances in the bran, middlings, oil cake meal, cracked corn and other farinaceous ingredients in the mixture are rendered sufficiently sticky to cause them to cohere permanently when submitted to pressure and also to enable these ingredients to hold bound in their cohesive mass all other ingredients of a non-farinaceous nature.

As the mixture is discharged from the steaming and heating drum, it falls upon a belt conveyer 9 which extends partly into the casing 2 and operates to convey the material to pressure rolls. Arranged above the conveyer 9 and supported upon a cross bar 12 is a reciprocating brush 13 which operates to distribute the mixture evenly over the width of the conveyer. The conveyer 9 is driven by means of a belt 14 which is driven by the motive power 15 which drives the pressure and die rolls.

The mixture is discharged from the conveyer 9 onto the feed chute 16, which is preferably a thin metallic sheet which rests against the conveyer and scrapes the mixture therefrom and directs it downward angularly to a position between the pressure rolls 17—18. These rolls are mounted in the frame 19 and are connected by the gears 21—22 so that they revolve synchronously and in opposite directions. The rolls are spaced apart the required distance to exert the necessary pressure upon the mixture and in order to prevent the mixture from adhering to the rolls it may be necessary to heat them internally with steam. After passing through the smooth steel pressure rollers the material emerges in the shape of a hard flexible continuous belt or ribbon, pressed sufficiently to enable it to hold together until it is fed into the die rollers or other means for forming it into granules or similar forms.

Upon emerging from the pressure rolls the cake moves along the guide table 23 and is fed between the die rollers 24—25 which are preferably arranged one above the other. These die rollers are provided with gears so that they revolve synchronously and in opposite directions and are driven from the gear 22 through the idler gear 26. These die rollers 24—25 may be heated internally with steam if desired and a feed box 27 may be provided for dusting the upper roller 24 with a suitable substance to prevent the feed from adhering thereto. The surfaces of the die rollers are provided with contiguous diamond shaped indentations 28, the rollers being so placed that as they revolve the indentations or the edges thereof on the upper roll register exactly with the similar elements on the lower roll. The bottoms of these indentations are curved so that the finished product 29 is somewhat elliptical in vertical longitudinal or cross section, and substantially diamond shaped in plan.

In order to insure the separation of the hard diamond shaped grains from the die rollers I prefer to cause them to adhere to the lower roll 25 and then provide means for positively stripping them therefrom. I accomplish this result by providing the lower roll 25 with circumferential grooves 31 passing through the apexes of the diamonds and into which some of the feed is forced, thereby causing the grains to adhere to the lower roll. These grains are, therefore, joined together circumferentially by a narrow connecting link 32 which is readily broken as the grains are stripped from the roll or at a later time. The grains are stripped from the roll by a plurality of stripping blades 33 bearing in the grooves 31 which act to force the grains from the dies.

As the grains or granules are removed from the lower roll they fall into an inclined chute 34 from which they fall into a receiving vessel 35 from which they are removed to be sacked. This chute 34 is provided with a blower 36 for blowing heated air over the grains to dry them and is provided on its bottom with steam pipes 37 which also assist in removing the excess moisture. The length of the chute 34 and the temperature of the air and steam are such that the grains are dried and hardened to the proper degree before they are deposited in the receiving vessel. In running down the chute and in dropping into the receiving vessel the grains are separated from each other, so that the final product consists of separate grains of mash feed, having the general physical properties of natural feed. Any grains which may adhere or be attached together will be separated by sacking and transporting before they are fed to the animals. It will be seen, therefore, that the final product is a hard granular mash feed composed of the desired ingredients to produce a balanced ration.

I claim:

1. The process of making granular mash feed which consists in moistening and heating the feed and forming it into granules by pressure while hot.

2. The process of making granular mash feed which consists in moistening and heating the feed, forming it into granules by pressure while hot and then drying the granules.

3. The process of making granular mash feed which consists in subjecting the feed to steam and forming granules from the hot mass by pressure.

4. The process of making granular mash feed which consists in subjecting the feed to steam, forming granules from the hot mass by pressure and then drying the granules.

5. The process of making granular mash feed which consists in heating and moistening the feed, forming it into a cake by pressure while hot and dividing the cake into granules by pressure.

6. The process of making granular mash feed which consists in subjecting the feed to steam, forming it into a cake by pressure and dividing the cake into granules by pressure.

7. The process of making granular mash feed which consists in agitating the feed in the presence of steam, forming it into a cake by pressure, dividing the cake into granules by pressure and subjecting the granules to heat.

8. The process of making granular mash feed which consists in moistening the feed, forming it into granules by pressure and subjecting the granules to heat and agitation.

9. The process of making granular mash feed which consists in moistening the feed, forming it into a cake by pressure, dividing the cake into granules and subjecting the granules to heat and agitation.

10. The process of making granular mash feed, which consists in steaming the mixture of the ingredients to moisten and burst the starch globules in the mixture, and forming the mixture into granules by pressure.

11. The process of making granular mash feed which consists in steaming the feed, forming it into a cake by pressure, dividing the cake into granules and subjecting the granules to heat and agitation.

In testimony whereof, I have hereunto set my hand at San Francisco, California, January 1912.

WILLIAM C. BOHRMANN.

In presence of—
H. G. PROST,
R. HEFFERNAN.